United States Patent
Maluck et al.

(10) Patent No.: US 9,945,756 B2
(45) Date of Patent: Apr. 17, 2018

(54) MEASUREMENT OF FOCAL POINTS AND OTHER FEATURES IN OPTICAL SYSTEMS

(71) Applicant: Heptagon Micro Optics Pte. Ltd., Singapore (SG)

(72) Inventors: Matthias Maluck, Zug (CH); Peter Roentgen, Thalwil (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 259 days.

(21) Appl. No.: 14/767,832

(22) PCT Filed: Feb. 18, 2014

(86) PCT No.: PCT/SG2014/000061
§ 371 (c)(1),
(2) Date: Aug. 13, 2015

(87) PCT Pub. No.: WO2014/133455
PCT Pub. Date: Sep. 4, 2014

(65) Prior Publication Data
US 2016/0011075 A1  Jan. 14, 2016

Related U.S. Application Data

(60) Provisional application No. 61/770,755, filed on Feb. 28, 2013.

(51) Int. Cl.
*G01M 11/02* (2006.01)
*G01J 3/28* (2006.01)
(Continued)

(52) U.S. Cl.
CPC ....... *G01M 11/0235* (2013.01); *G01J 3/0208* (2013.01); *G01J 3/0237* (2013.01);
(Continued)

(58) Field of Classification Search
CPC .. G01M 11/0235; G01M 11/0207; G01J 3/28; G01J 3/0237; G01J 3/0208; G02B 7/04; G02B 7/02; G02B 7/28
(Continued)

(56) References Cited

U.S. PATENT DOCUMENTS

7,535,556 B2    5/2009  Yonggang
8,553,231 B2 *  10/2013  Medicus .............. G01B 9/0209
                                                    356/511
2008/0174883 A1   7/2008  Oya

FOREIGN PATENT DOCUMENTS

CN    101261347    9/2008
CN    101276031    10/2008
(Continued)

OTHER PUBLICATIONS

Gu et al, "Reflection/transmission confocal microscopy characterization of single-crystal diamond microlens arrays", Apr. 12, 2004, Applied Physics Letters, vol. 84, No. 15, pp. 2754-2756.*
(Continued)

*Primary Examiner* — Hina F Ayub
*Assistant Examiner* — Amanda Merlino
(74) *Attorney, Agent, or Firm* — Fish & Richardson P.C.

(57) ABSTRACT

Identifying a location of a focal point of an optical system includes, in some implementations, using a sensor system to detect light that passed through the optical system, and determining a location of a focal point of the optical system based on a location of a focal point of the sensor system that substantially matches the location of the focal point of the optical system.

5 Claims, 8 Drawing Sheets

(51) Int. Cl.
G02B 7/02 (2006.01)
G02B 7/04 (2006.01)
G02B 7/28 (2006.01)
G01J 3/02 (2006.01)

(52) U.S. Cl.
CPC .......... *G01J 3/28* (2013.01); *G01M 11/0207* (2013.01); *G02B 7/02* (2013.01); *G02B 7/04* (2013.01); *G02B 7/28* (2013.01)

(58) Field of Classification Search
USPC ....................................................... 356/125
See application file for complete search history.

(56) References Cited

FOREIGN PATENT DOCUMENTS

| | | |
|---|---|---|
| CN | 102645322 A | 8/2012 |
| CN | 103066080 | 4/2013 |
| JP | 2009014905 | 1/2009 |
| WO | 2012/022000 | 2/2012 |
| WO | 2012/159651 | 11/2012 |

OTHER PUBLICATIONS

International Search Report and Written Opinion in International Patent Application No. PCT/SG2014/000061, dated Jul. 1, 2014.
LD Didactic, "Open Frame CD/DVD Reader," 23 pages (2010).
Search Report issued in Chinese Application No. 201480016953.5 dated Oct. 9, 2016, with English Translation, 5 pages.

\* cited by examiner

MEASUREMENT OF FOCAL POINTS AND OTHER FEATURES IN OPTICAL SYSTEMS

FIELD OF THE DISCLOSURE

This disclosure relates to measuring focal points and other features in optical systems.

BACKGROUND

Optical and opto-electronic devices typically include one or more active or passive optical components. Passive components, such as reflective, refractive, diffractive or other lenses, for example, can help direct or guide light in a desired way. It often is critical to the proper functioning of the device that various values relating to the passive optical components satisfy tight tolerances. Measurements often are made to determine whether such passive optical components meet desired requirements, or to determine whether adjustments may need to be made prior to shipping or further manufacturing. Such measurements, however, can be time-consuming, thereby increasing the overall manufacturing cost of the optical devices and systems. It is, therefore, desirable to improve the efficiency of such optical measurement techniques.

SUMMARY

Techniques are described for determining the focal point of an optical system, which can include one or more optical elements such as lenses or prisms.

For example, in one aspect, the disclosure describes techniques for determining the focal point of a lens system by matching the focal point of the lens system with the focal point of sensor system. Thus, a method of identifying a location of a focal point of an optical system can include using a sensor system to detect light that passed through the optical system, and determining a location of a focal point of the optical system based on a location of a focal point of the sensor system that substantially matches the location of the focal point of the optical system. Various types of sensor systems can be used. Examples include polychromatic or monochromatic confocal sensors, confocal microscopes, white light interferometers, and sensors that include an astigmatic optical element.

According to another aspect, a method of identifying a location of a focal point of an optical system includes using a sensor system that includes an astigmatic optical element to detect light that passed through the optical system, and determining an extent of mismatch between a location of the focal point of the optical system and a location of a focal point of the sensor system based on an image of the detected light detected by the sensor system. An approximate location of the focal point of the optical system is determined based on the extent of the mismatch. For example, in some implementations, the extent of the mismatch is determined based on the ellipticity of the image detected by the sensor system.

Various systems for implementing the techniques also are described. The systems also can be used, for example, to measure a distance to a reference surface associated with the optical system under test. The measurements then can be used, for example, to calculate the flange focal length (FFL) for the particular optical system.

Some implementations can achieve relatively fast and accurate scanning of multiple devices. The resulting measurements can be used, for example, to check whether the devices meet manufacturing tolerance requirements and, if needed, to adjust features of the devices during subsequent fabrication.

Other aspects, features and advantages will be readily apparent from the following detailed description, the accompanying drawings and the claims.

DETAILED DESCRIPTION

Figure 1:
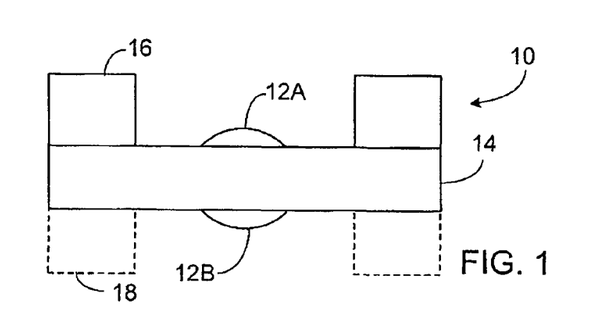
FIG. 1 illustrates an example of a device that includes an optical system.

As shown in FIG. 1, an optical device 10, or part of an optical device, includes an optical system that includes optical elements 12A, 12B, respectively, on upper and lower surfaces of a member 14. Examples of optical elements 12A, 12B include reflective, refractive, diffractive lenses and prisms. In some implementations, such optical structures may be present on only one side of member 14 rather than both sides. The optical system can thus include a single optical element or a combination of two or more optical elements. The optical system also can include lens stacks with several optical elements stacked in the vertical direction. Member 14, to which optical elements 12A, 12B are mounted or attached, can be composed of a substantially transparent material or, in some implementations, may be composed of a non-transparent material that has holes filled with transparent material at the locations of optical elements 12A, 12B.

In the illustrated example, a baffle structure 16 surrounds optical element 12A and is attached to the upper surface of member 14, and a spacer member 18 surrounds optical element 12B and is attached to the lower surface of member 14. Optical device 10 can be attached, for example, to a substrate (not shown) on which is mounted an opto-electronic device such as a light emitting or light sensing component. The opto-electronic device can be aligned with the optical elements.

The following paragraphs describe techniques for determining the focal point of an optical system (e.g., a lens system) by matching the focal point of the optical system with the focal point of sensor system that includes an objective lens (e.g., as part of the sensor optics). In some implementations, the techniques include directing light from a sensor system through a lens system and determining a focal point of the lens system based on light reflected back through the lens system and sensed by the sensor system.

Figure 2:
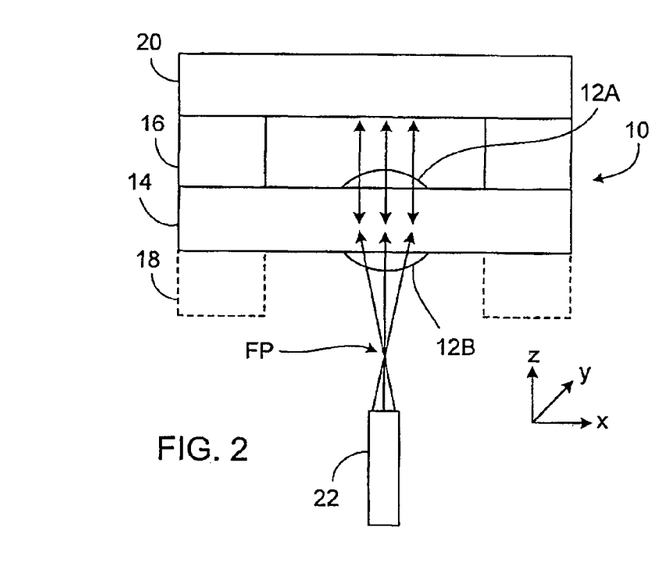
FIG. 2 illustrates a technique for detecting a focal point of an optical system using a confocal sensor.

FIG. 2 illustrates an example of a technique of using a confocal sensor to determine the position of the focal point FP of an optical system that includes elements 12A, 12B. As shown in FIG. 2, a mirror or other reflective surface 20 is placed on one side of optical device 10 (e.g., on the top surface of baffle 16), and a confocal sensor 22 is positioned on the opposite side of the optical device. Confocal sensor 22 should be positioned in line with the optical axis of optical elements 12A, 12B.

Figure 3:
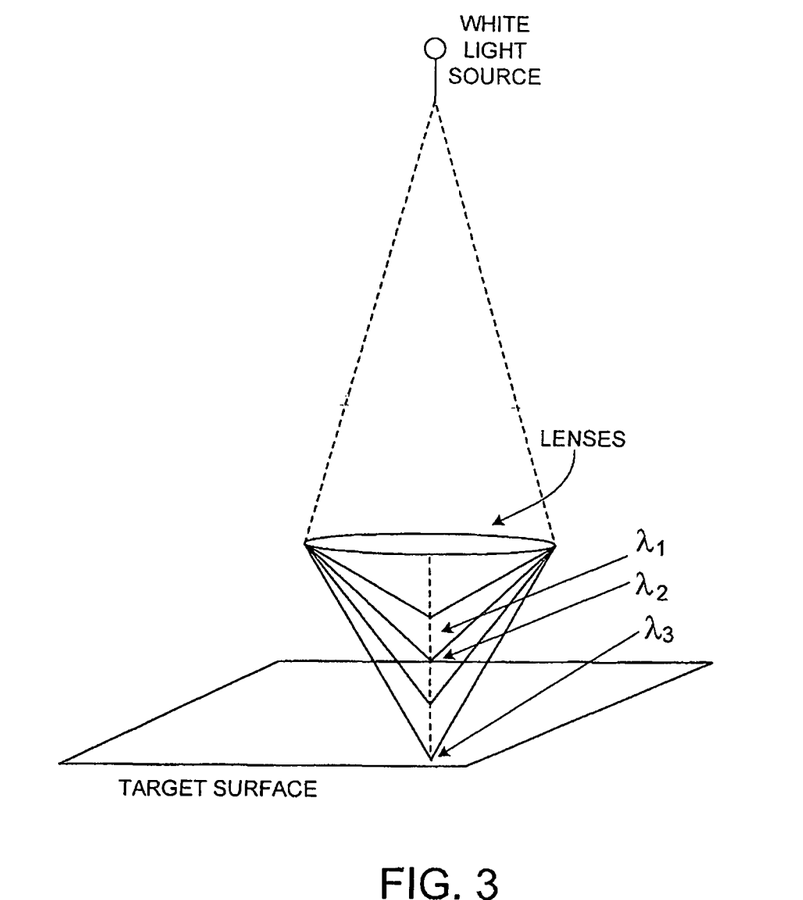
FIG. 3 illustrates how the distance of focal points of a polychromatic confocal sensor depends on wavelength.

Confocal sensor 22 can be implemented, for example, using a polychromatic white light source that is focused onto the target surface using a multi-lens optical system. Confocal sensor 22 includes a light emitter and light receiver that can be arranged along the same axis. One or more lenses are arranged so that the white light is dispersed into monochromatic light by controlled chromatic deviation. The dispersed light is focused with each monochromatic wavelength having different axial positions of the focal point. See FIG. 3. The light reflected by the target surface is received by the object lens and guided, for example, by a beam splitter to a spectral analyzer which contains a row of photo diodes. The spectral analyzer causes the light to impinge on a certain location of the row of the photo diodes dependent on the received wavelength. Thus, the receiver detects and processes the spectral changes. In other implementations, confocal sensor 22 can be implemented using a monochromatic light source (e.g., a laser), in which case the sensor (or an objective lens of the sensor) can be moved up and down in the z-direction to adjust the position of the sensor's focal point. Such polychromatic and monochromatic confocal sensors are commercially available.

Figure 4:
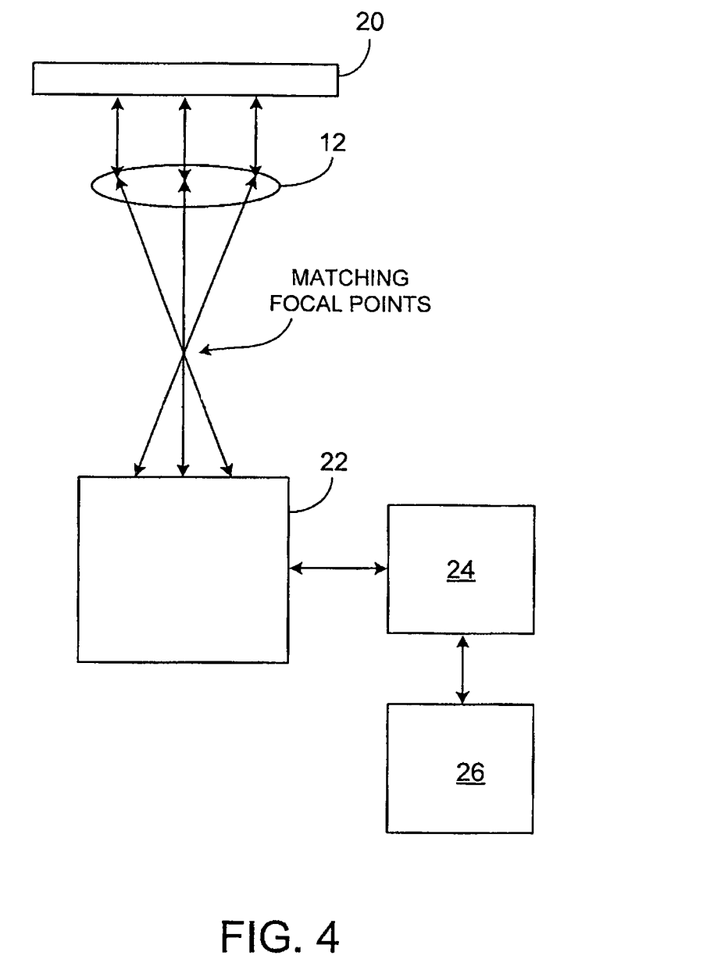
FIG. 4 illustrates geometric optics associated with detecting the focal point of an optical system.

The geometric optics associated with detecting the focal point FP of an optical system 12 (e.g., a lens or prism) is illustrated in FIG. 4. To ensure that the reflected rays travel substantially along the same path as the incident rays, mirror 20 should be placed in a plane that is substantially perpendicular to the optical axis. This can be accomplished, for example, by placing mirror 20 in contact with the upper surface of baffle 52. In the case of a polychromatic light source, confocal sensor 22 detects a signal at a particular wavelength of light only if the focal point of optical system 12 matches (i.e., is substantially the same as) the focal point of confocal sensor 22. Based on the wavelength of light which confocal sensor 22 detects, the focal point, as well as the focal length, of lens system 12 can be determined, for example, using a controller 24 coupled to confocal sensor 22. Sensor 22 (or sensor controller 24) can store distance values for each wavelength, where the distance values correspond to the focal point in an optical sensing measurement and the distance to a reference plane in a distance sensing measurement. All aspects of the data acquisition, scanning, and displaying of the measured data can be under software control and fully automated.

Thus, as shown in FIG. 2, by directing light from confocal sensor 22 through optical elements 12A and 12B, and determining the wavelength of light that is detected by the confocal sensor (or determining the position of the confocal sensor along the z-axis), a focal point of the optical system (in this case, optical elements 12A, 12B) can be obtained. The focal length of the optical system (i.e., the distance from the focal point to the lens system) can be obtained, as well, based on the identified focal point.

Figure 5:
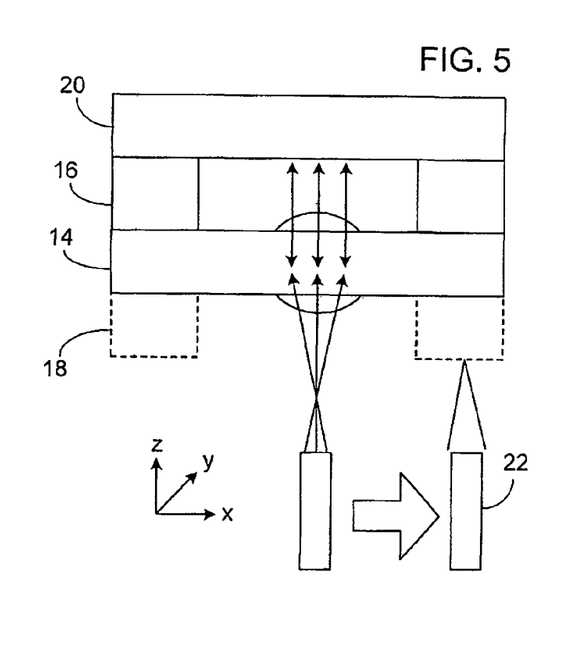
FIG. 5 illustrates a technique for determining the distance to a reference surface using a confocal sensor.

Confocal sensor 22 also can be used to obtain other measurements. For example, confocal sensor 22 can be moved horizontally (i.e., substantially in parallel with member 14, along the x-axis) to a second position (e.g., below spacer member 18, as shown in FIG. 5). Once in the second position, confocal sensor 22 can be used, in known manner, as a surface profiler to detect the distance from a reference surface (e.g., the physical plane of device 10 that is closest to sensor 22, which, in the example of FIG. 5, is the near surface of spacer member 18). The distance between the objective lens and the reference surface then is determined using sensor internal calibration.

A single polychromatic or monochromatic confocal sensor 22 can, therefore, be used to obtain two different types of measurements with respect to the device 10. In the foregoing example, one measurement uses optical sensing to determine the focal point of the optical system, whereas a second measurement uses distance sensing to detect the distance to a reference surface. The technique can be advantageous because, at least in some implementations (e.g., where a polychromatic light source is used), it does not require scanning along the optical axis (i.e., the z-axis in FIG. 5). Furthermore, even in situations where scanning along the optical axis is required (e.g., where a monochromatic light source is used), the scanning can be performed at a relatively high frequency. In addition, back side illumination is not needed for the foregoing measurements.

The two types of measurements can be made in either order. Thus, in some implementations, the optical sensing technique to determine the focal point of the optical system is performed first, and the distance sensing technique to determine the distance to the reference surface is performed subsequently. In other implementations, the distance sensing technique to obtain the distance to the reference surface is performed first, and the optical sensing technique to obtain the focal point of the optical system is performed subsequently.

Figure 8:
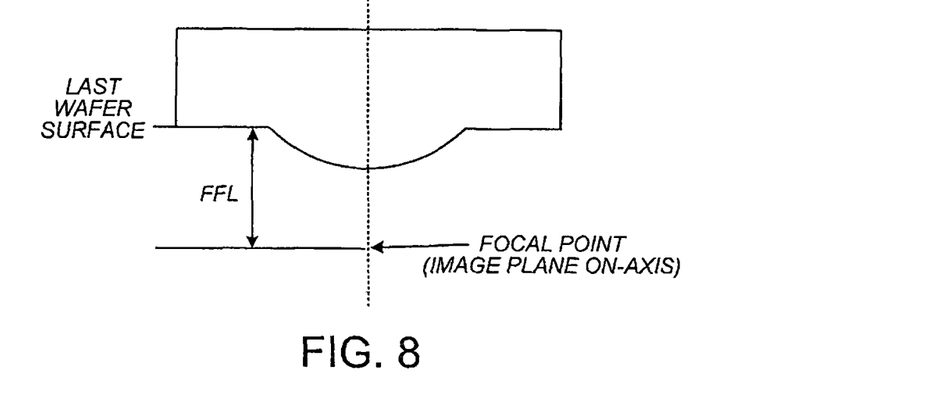
FIGS. 8 and 9 illustrate examples of focal points, reference surfaces and flange focal length (FFL).
Figure 9:
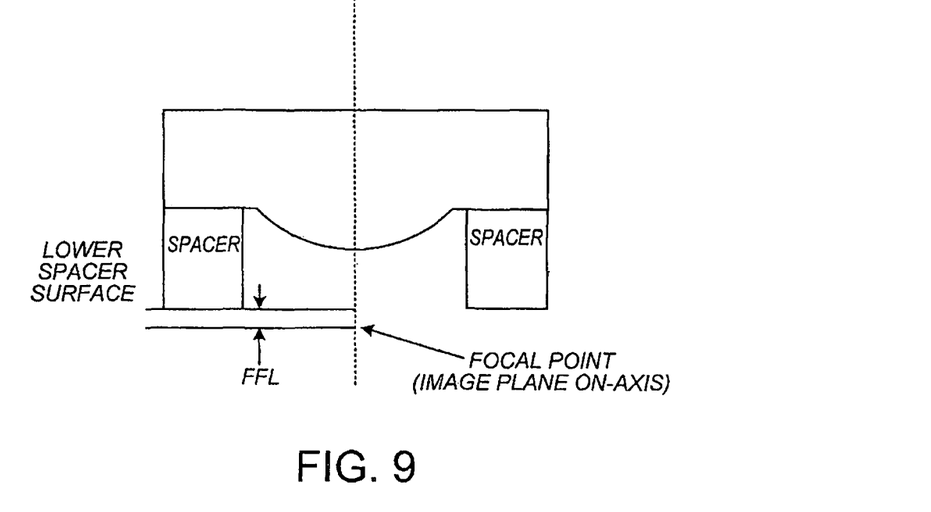

The sensed signals and information can be provided to a computing system (e.g., personal computer 26 in FIG. 4) for further processing. For example, it may be desirable in some applications to calculate the flange focal length (FFL) for device 10, where the FFL value equals the distance between the last physical plane of the device (i.e., the physical plane of device 10 that is closest to sensor 22) and the focal point of the device's optical system. FIGS. 8 and 9 illustrate examples having different surfaces that serve as reference surface for calculating the FFL. Thus, FIG. 8 is an example in which the reference surface is the near surface of an optics wafer, whereas FIG. 9 is an example in which the reference surface is the near-surface of a lower spacer wafer below the optics wafer. The calculated FFL value can be used, as necessary, for quality checks and/or to make optical adjustments to device 10 in later processing steps. For example, the length of a spacer that forms part of device 10 can be adjusted according to the calculated FFL value.

The foregoing example illustrates how a confocal sensor can be used to obtain measurements of a single optical device 10. Similar measurements can be made sequentially with respect to multiple devices 10. Such an approach can be especially useful, for example, in wafer-level fabrication processes. In a wafer-level process, the measurements (optical sensing and distance sensing) can be performed, for example, sequentially for each lens system, one at a time. In other implementations, the optical sensing technique can be performed to obtain the focal points for all of the optical systems (e.g., lens systems), followed by performance of the distance sensing technique to obtain the respective distance for all the corresponding reference surfaces (or vice-versa). In other applications, the measurements can be performed after the individual devices have been separated from one another (e.g., by dicing). In that case, the measurements can be performed, for example, with the diced devices attached to a tape. In some implementations, it may be desirable to attach the lens stacks to a FFL correction layer and subsequently measure the focal point and FFL value.

Figure 6:
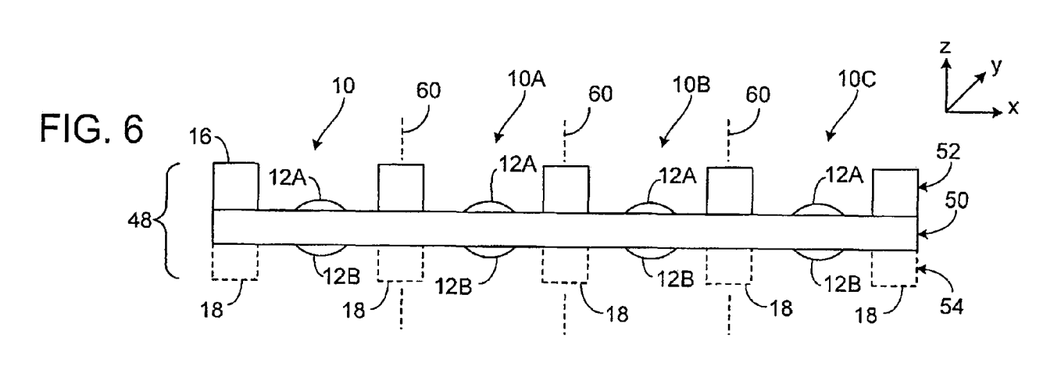
FIG. 6 illustrates an example of a wafer stack including multiple optical systems.

For example, as shown in FIG. 6, a wafer stack 48 includes multiple optical systems, each of which comprises lenses 12A, 12B, formed on the upper and lower surfaces of a first substantially transparent wafer 50. Lenses 12A, 12B can be, for example, optical elements formed on wafer 50 by a replication process. In some implementations, optical systems including optical elements are formed by injection molding techniques. In some implementations, wafer 50 can be composed of a non-transparent material that has openings filled with a transparent material at the locations of lenses 12A, 12B. Baffles 16 and spacers 18 can be provided, respectively, by a second wafer 52 and a third wafer 54, which are attached to first wafer 50. In general, a wafer can be cylindrical with a diameter, for example, of 2, 4, 6, 8 or 12 inches, one inch being about 2.54 cm. The wafer thickness can be, for example, between 0.2 mm and 10 mm, and in some cases, is between 0.4 mm and 6 mm. Different materials and dimensions may be appropriate for other implementations. Although FIG. 6 only shows provisions for four optical devices (10, 10A, 10B, 10C), in some implementations there can be, in one wafer stack, provisions for an array of at least ten devices in each lateral direction (i.e., the x and y directions), and in some cases at least thirty or even fifty or more devices in each lateral direction.

Figure 7:
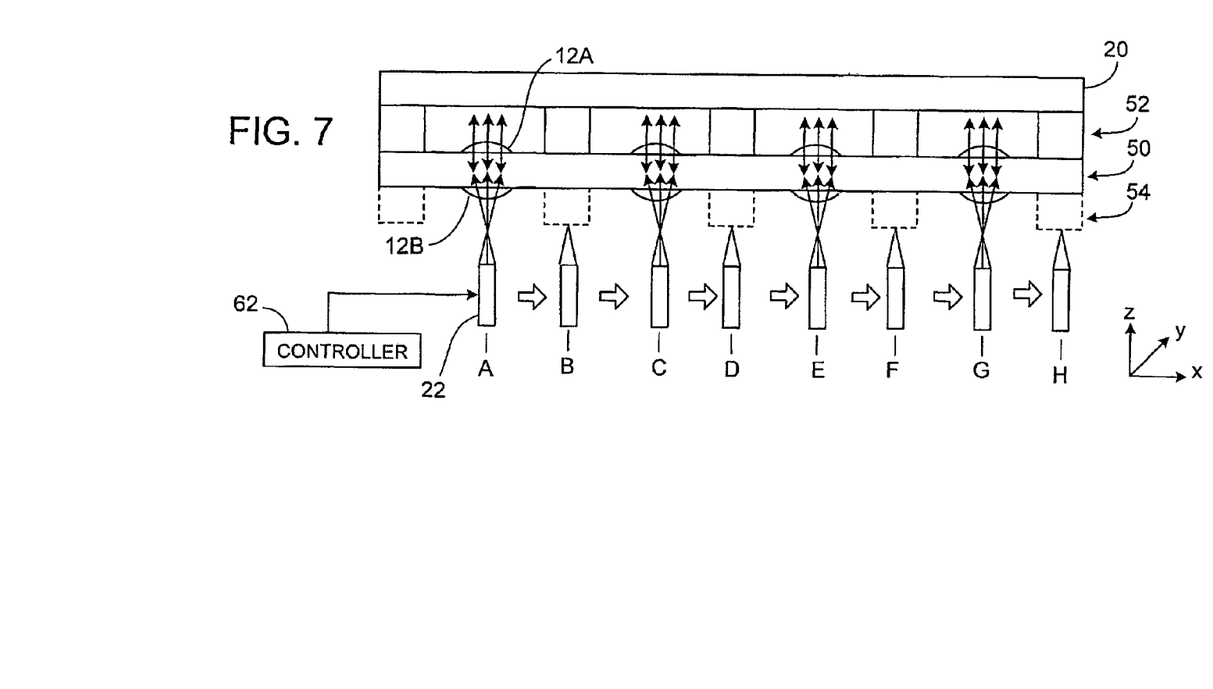
FIG. 7 illustrates a technique for determining focal points of different optical systems on a wafer stack as well as distances to reference surfaces on the wafer stack

The techniques described above for using a confocal sensor to make various measurements based on optical and distance sensing can be employed for the array of devices. Depending on the implementation, a single confocal sensor 22 or multiple confocal sensors 22 can be used to make the measurements for the devices in the array. Thus, if wafer stack 48 includes an array composed of rows and columns of devices 10, a single confocal sensor 22 can scan one row (or column) at a time. As indicated by FIG. 7, a controller 62 can be coupled to a stage on which confocal sensor 22 is mounted to move the confocal sensor laterally with respect to the wafer stack 48. Thus, for example, controller 62 can cause confocal sensor 22 to be moved along the x-axis from position A to position B, then to position C, etc. until it reaches position H. At each specified position, movement of confocal sensor 22 is stopped briefly so that it can perform a measurement (e.g., location of the focal point of an optical system mounted on the wafer stack or the distance to a reference surface on the wafer stack). In some implementations, if the measurements are performed sufficiently slowly, movement of the sensor may not need to be stopped. At positions A, C, E and G, an optics sensing technique is employed to determine the focal point of one of the optical systems (i.e., including a pair of lenses 12A, 12B). At positions B, D, F and H, a distance sensing technique is used to determine the distance from confocal sensor 22 to the various reference surfaces defined by third wafer 54.

After measurements have been made with respect to the devices in a particular row (or column), controller 62 can cause confocal sensor 22 to move, for example, in the y-direction, to the next row (or column) in the array. This process can be repeated until measurements have been made for all devices 10 on the wafer stack 48. As explained above, the information obtained by confocal sensor 22 can be processed by computing system 26 (see FIG. 4). For example, in some implementations, computing device 26 can calculate a corresponding FFL value for each device. The FFL values may be used for quality checking purposes and/or to adjust devices 10 in subsequent processing steps. Using confocal sensor 22 can result in relatively fast scans of the entire array of devices 10, in some implementations, on the order of less than one second for each optical system (i.e., lenses 12A, 12B).

After performing the measurements using confocal sensor 22, wafer stack 48 can be separated (e.g., diced) along lines 60 to form individual devices 10, 10A, 10B, 10C, etc.

Although the foregoing example describes use of a confocal sensor to scan an array of devices that are part of a wafer stack, the foregoing techniques also can be used to scan an array of individual devices 10 that are held, for example, in a tray. In that case, a single confocal sensor 22 can be moved across the array (e.g., one row or column at a time) to obtain the focal point of the optical system (e.g., the lenses) of each device 10 as well as the distance to a respective reference surface.

In some implementations, instead of moving confocal sensor 22 with respect to an individual device 10 or array of devices, the device or array of devices can be moved relative to the confocal sensor. In that case, controller 62 can be coupled to a stage on which wafer stack 48 rests or to a tray holding devices. In some implementations, both the sensor and the devices can be moved relative to one another. For example, in some cases, wafer stack 48 is moved only in the x-direction, and sensor 22 is moved only in the y-direction. In some cases, movement in the z-direction also may take place. For example, in order to match the focal points of the sensor and device under test, the measurement range should cover the focal point. Thus, depending on the particular arrangement, confocal sensor 22 can scan one or more devices 10 either by moving the confocal sensor, by moving the devices or by moving both the sensor and the devices.

In some implementations, instead of a confocal sensor to determine the focal point of the optical system, a confocal microscope can be used. As in the case of a confocal sensor, the focal point of the optical system (e.g., lenses 12A, 12B) can be determined by directing light from the confocal microscope through the optical system, reflecting the light back through the optical system, and determining the position at which the focal point of the optical system matches the focal point of the confocal microscope based on the light sensed by the confocal microscope.

In addition, the confocal microscope can be used, in known manner, as a surface profiler to determine the distance from a reference surface (e.g., the physical plane of device 10 that is closest to sensor 22). Furthermore, in some implementations, the two types of measurements (i.e., the optical sensing technique to determine the focal point of the optical system and the distance sensing technique to determine the distance to the reference surface) can be performed without moving the confocal microscope horizontally along the x- or y-axes. Thus, in some cases, the confocal microscope can obtain both types of measurements for a given optical system from a single position.

As with the confocal sensors, a confocal microscope can be used to scan an entire array of optical systems during a wafer-level fabrication process. The scanning can be performed either by moving the confocal microscope relative to the optical systems or by moving the optical systems relative to the confocal microscope. The confocal microscope can be used to perform the measurements on optical systems after they have been separated from one another. A computing system can use the measured values to calculate a corresponding FFL value for each device.

In other implementations, a white light interferometer can be used to determine the focal point of an optical system (e.g., lenses 12A, 12B). Here too, the focal point of the optical system can be determined by matching the focal point of the optical system with the focal point of white light interferometer. The white light interferometer also can be used to perform optical sensing techniques and distance sensing techniques simultaneously.

Figure 10:
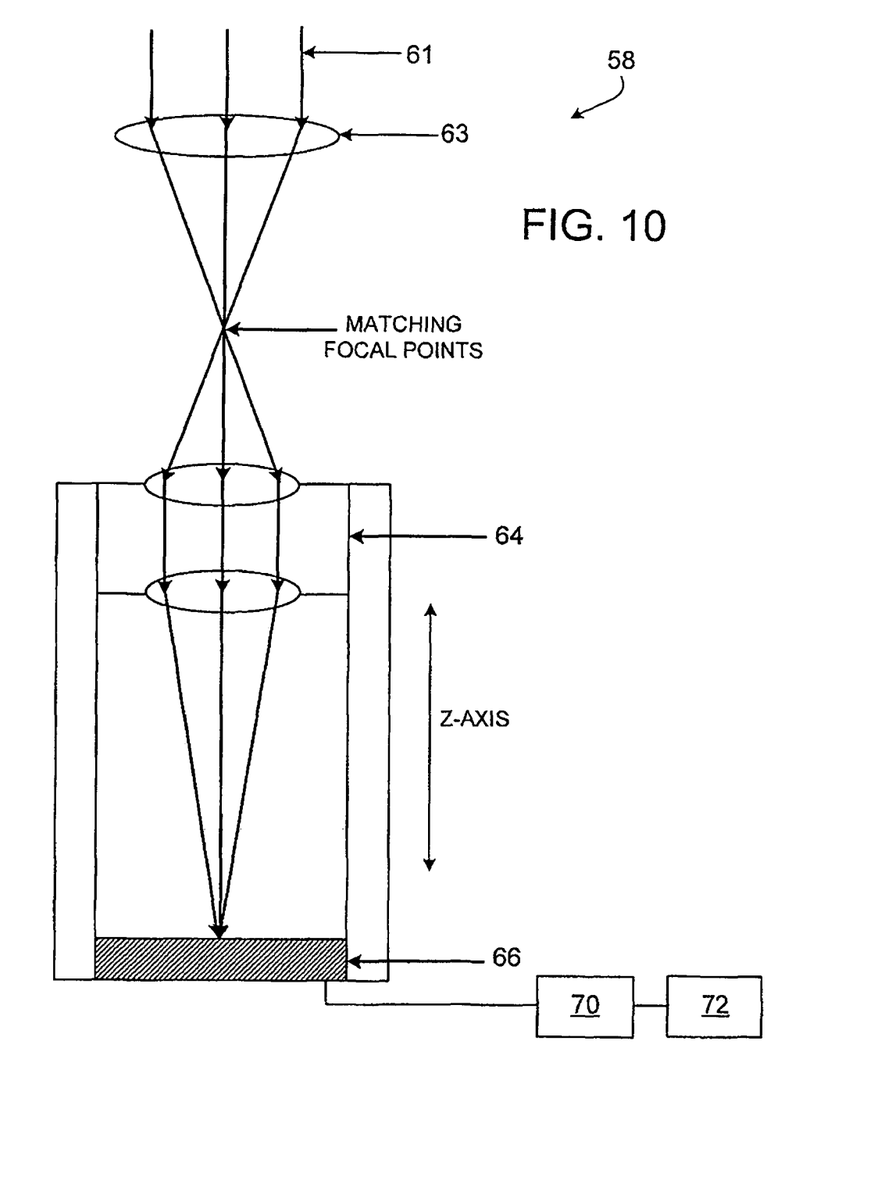
FIG. 10 illustrates use of a sensor system, which includes an astigmatic element, to determine the focal point of an optical system.

In addition to confocal sensors, confocal microscopes and white light interferometers, another type of sensor system that can be used for focal point detection is one that includes an astigmatic component (e.g., an astigmatic lens) as part of, or in addition to, its relay optics. An example of such a sensor system 58 is illustrated in FIG. 10, which shows back illumination in the form of collimated light 61 being provided into an optical system 63 under test. In the illustrated example, optical system 63 includes a single lens; however, in other implementations, the optical system may include additional lenses or other optical elements. The light source for the back illumination can be, for example, a LED or a laser. Relay optics 64, which includes an astigmatic component, focuses the incoming light onto a semiconductor light sensor (e.g. a CMOS sensor) 66. In some cases, collimated backlight can be used in the confocal sensors. In such cases, the reflective surface can be replaced with a collimated backlight, and the light source of the confocal sensor can be switched off. However, this type of arrangement would lose it "confocal" behavior because only the sensor part is used.

Figure 11A:
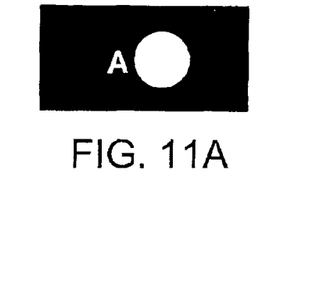
FIGS. 11A and 11B illustrate examples of images detected by the sensor system of FIG. 10.
Figure 11B:
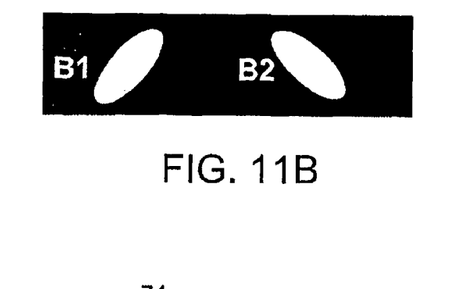

If the focal point of the lens under test 63 matches the focal point of relay optics 64, the focal point will be focused substantially perfectly onto the sensor and will be detected substantially as a circle (see 'A' in FIG. 11A). In some cases, the image appearing on the sensor may have a circular but blurred shape with little or no ellipticity. On the other hand, if there is a mismatch between the two focal points along the optical axis (i.e., the z-axis in FIG. 10), the image on sensor 66 will appear elliptical, with the direction of the principal axis of the ellipse depending on the prefix of the mismatch (see 'B1' and 'B2' in FIG. 11B). If there is a mismatch, then, in some implementations, relay optics 64 (or the entire sensor system) are moved along the z-axis until the two focal points substantially match (i.e., until the image detected by sensor 66 appears substantially circular). Alternatively, scanning is performed with moving relay optics 64 at several predetermined positions along the z-axis, and the location at which there is a best match (i.e., the location which results in the detected image having the least amount of ellipticity) is identified. That position will correspond to the situation in which the focal point of the sensor system and the focal point of the optical system match or closely match. In some cases, finding the best match can be supported by fitting the measurement curve to obtain higher accuracy. The sensor system controller 70 can store the correlation between positions of relay optics 64 and locations of the sensor system's focal point. The location of the focal point of the lens under test 63 then can be determined automatically (e.g., by a computing device such as a personal computer 72) since it matches the location of the sensor system's focal point.

In some implementations, instead of adjusting the position of relay optics 64 until the focal point of the optical system matches the focal point of sensor system, the sensor system of FIG. 10 can be used in alternative way to determine the focal point of the optical system (e.g., lens 63). As noted above, the ellipticity (if any) in the image detected by sensor 66 is indicative of the extent to which the focal points of the sensor system and optical system match or do not match. When there is a mismatch between the focal points, the principal axis of the ellipse depends on the prefix of the mismatch in the z-direction (i.e., along the optical axis). Computing device 72 can store in memory information correlating the ellipticity of the image detected by sensor 66 and the distance between the focal point of the sensor system and the focal point of the optical system. Thus, the focal point of the optical system 63 can be determined based on a single measurement by sensor 66. One advantage of this technique is that scanning along the z-axis (i.e., the optical axis) is not necessary. On the other hand, scanning along the z-axis as described above may result in more accurate determinations of the position of the optical system's focal point.

Figure 12:
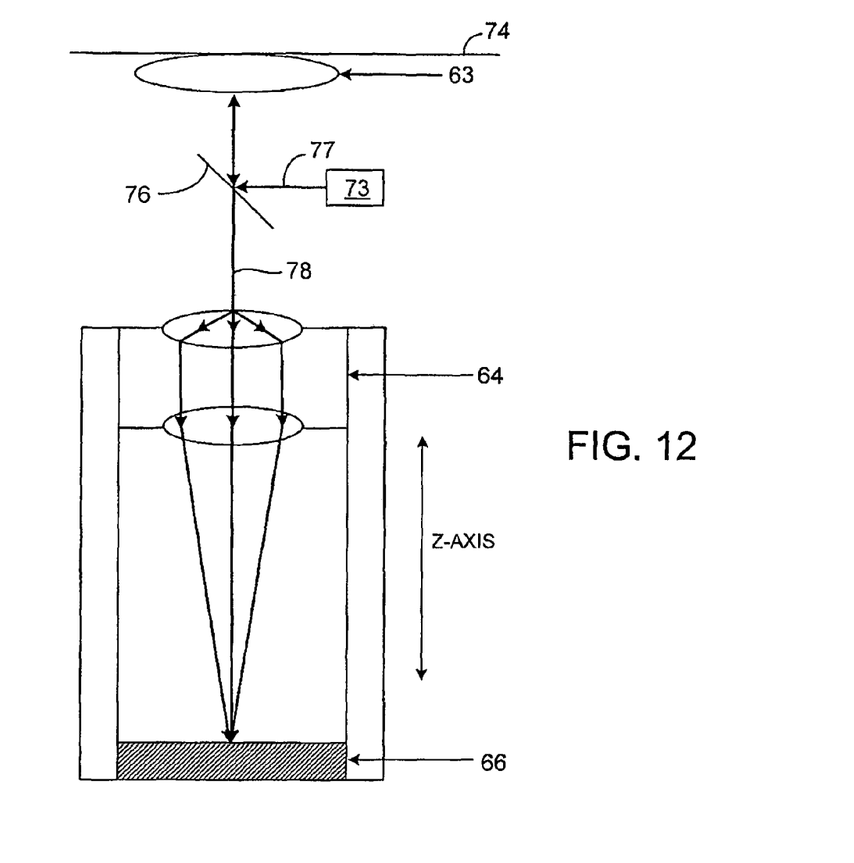
FIG. 12 illustrates another example of a sensor system, which includes an astigmatic element, to determine the focal point of an optical system.

In the implementation of FIG. 10, back-illumination is used such that the light source is located on one side of optical system 63 and sensor system (including sensor 66 and relay optics 64) is located on the opposite side of the optical system. In other implementations, as shown in FIG. 12, a light source 73 and relay optics 64 can be located on the same side of the optical system 63, and a mirror or other reflecting surface 74 can be placed behind optical system 63. In that case, a beam splitter 76 can be provided to separate the incoming beam 77 and the reflected beam 78.

Figure 13:
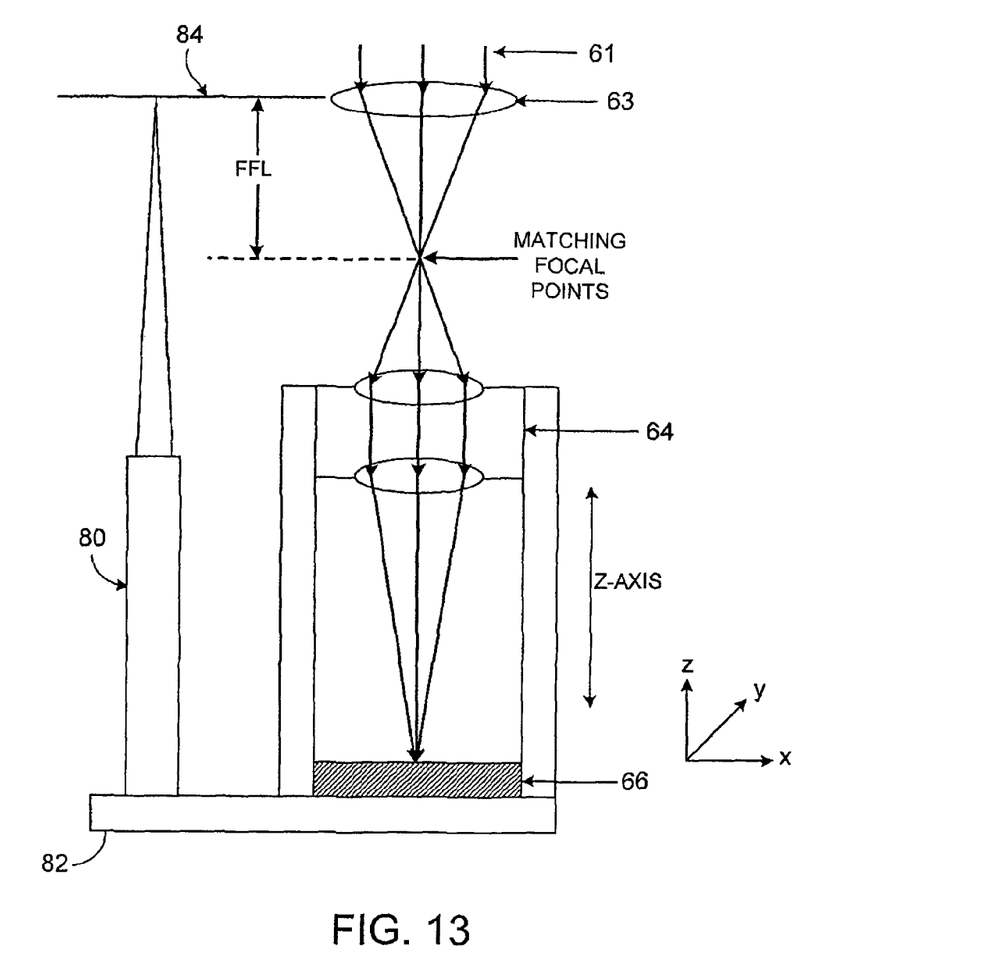
FIG. 13 illustrates an example of the sensor system of FIG. 10 in combination with a distance sensor.

As illustrated in FIG. 13, a distance sensor 80 can be provided on a common stage 82 adjacent sensor system 58. Distance sensor 80 can be used to determine the distance from a reference surface 84 associated with optical system 63. Furthermore, in some implementations, the two types of measurements (i.e., the optical sensing technique to determine the focal point of the optical system and the distance sensing technique to determine the distance to the reference surface) can be performed with respect to a particular optical system 63 without moving the stage horizontally along the x- or y-axes. As explained above, the two measurements can be used (e.g., by a computing device coupled to the sensors) to calculate the FFL to optical system 63.

The sensor system of FIG. 12 also can be used to make two types of measurements (i.e., an optical sensing measurement to determine the focal point of the optical system and a distance sensing measurement to determine the distance to the reference surface). In that case, however, it may be necessary to move the sensor system slightly along the x- or y-axes to perform the second of the two measurements.

As also noted above, in some implementations, instead of moving the sensor along the x- and y-axes with respect to an individual device or array of devices, the device or array of devices can be moved relative to the sensor system. Thus, depending on the particular arrangement, any of the foregoing sensor systems can scan one or more devices under test either by moving the sensor system, by moving the devices or by moving both sensor system and the devices relative to one another.

Other implementations are within the scope of the claims.

What is claimed is:
1. A method of identifying a location of a focal point of an optical system, the method comprising:
   using a sensor system to detect light that passed through the optical system, the optical system forming part of an optical device in which the optical system includes a stack of lenses and/or prisms, and the sensor system including a polychromatic confocal sensor;

directing light of different wavelengths from the confocal sensor through the optical system;

detecting in the confocal sensor system light that was reflected back through the optical system; and determining the focal point of the optical system based on the wavelength of light detected by the sensor system.

2. The method of claim 1 including:

adjusting a position of an objective lens of the confocal sensor along an optical axis of the optical system;

using the sensor system to make a respective measurement while the objective lens is at different positions along the optical axis of the optical system; and determining the focal point of the optical system based on the measurement at a particular one of the positions at which light is detected by the confocal sensor.

3. The method of claim 1 further including using the confocal sensor to measure a distance to a reference surface associated with the optical system.

4. The method of claim 3 further including using the location of the focal point of the optical system and the distance to the reference surface to obtain a flange focal length.

5. The method of claim 1 wherein the confocal microscope performs first and second measurements from a single position, wherein the position at which the focal point of the optical system matches the focal point of the confocal microscope is determined from one of first or second measurements, and wherein the distance from the reference surface is determined from the other one of the first or second measurements.

* * * * *